US006401183B1

(12) United States Patent
Rafizadeh

(10) Patent No.: US 6,401,183 B1
(45) Date of Patent: Jun. 4, 2002

(54) SYSTEM AND METHOD FOR OPERATING SYSTEM INDEPENDENT STORAGE MANAGEMENT

(75) Inventor: Schumann Rafizadeh, Highlands, TX (US)

(73) Assignee: Flash Vos, Inc., Houston, TX (US)

(*) Notice: Subject to any disclaimer, the term of this patent is extended or adjusted under 35 U.S.C. 154(b) by 0 days.

(21) Appl. No.: 09/283,418

(22) Filed: Apr. 1, 1999

(51) Int. Cl.$^7$ .............................. G06F 12/00; G06F 9/00
(52) U.S. Cl. ........................... 711/173; 711/170; 713/1; 713/2; 713/100
(58) Field of Search .................. 711/173, 170; 713/1, 2, 100

(56) References Cited

U.S. PATENT DOCUMENTS

| | | | | |
|---|---|---|---|---|
| 4,626,986 A | * | 12/1986 | Mori | 364/200 |
| 5,134,580 A | * | 7/1992 | Bertram et al. | 395/650 |
| 5,278,973 A | * | 1/1994 | O'Brien et al. | 395/500 |
| 5,361,358 A | * | 11/1994 | Cox | 395/700 |
| 5,802,363 A | * | 9/1998 | Williams et al. | 395/652 |
| 6,061,788 A | * | 5/2000 | Reynaud et al. | 713/2 |
| 6,088,794 A | * | 7/2000 | Yoon et al. | 713/2 |
| 6,167,532 A | * | 12/2000 | Wisecup | 713/300 |
| 6,178,487 B1 | * | 1/2001 | Ruff | 711/165 |
| 6,178,503 B1 | * | 1/2001 | Madden | 713/2 |
| 6,185,575 B1 | * | 2/2001 | Orcutt | 707/200 |
| 6,185,666 B1 | * | 2/2001 | Murray et al. | 711/173 |
| 6,192,456 B1 | * | 2/2001 | Lin | 711/173 |
| 6,247,126 B1 | * | 6/2001 | Beelitz | 713/1 |

OTHER PUBLICATIONS

Powerquest, PartitionMagic, 1994–1997, Version 8, pp. 126, 128, 130 and 136.*
Werner Almesberger, Llnux LOader, (LILO), Version 21, pp. 2–7, Dec. 1998.*

* cited by examiner

Primary Examiner—Do Hyun Yoo
Assistant Examiner—Kimberly McLean
(74) Attorney, Agent, or Firm—Timothy M. Donoughue; Hugh R. Kress; Winstead Sechrest & Minick, P.C.

(57) ABSTRACT

A Storage Manager that dynamically manipulates and partitions the secondary storage of a computer device without re-writing or revising the secondary storage after each manipulation. The Storage Manager is represented by executable code between the firmware level and the run time operating system and application program level of a computer device. Means are provided to transfer control of the computer device to the Storage Manager prior to the run time operating system or application program gaining control of the computer device. Storage Manager includes a Virtual Table of Contents (VTOC), in which relevant identifying information is contained for each Partition of the secondary storage. At least one Cabinet is created, containing a list of Partitions. Each Cabinet can have a separate list of Partitions, and one Partition can be included in more than one Cabinet. One of the Cabinets is designated as an Active Cabinet. Upon continuation of the boot sequence, the contents (ie., the list of Partitions within that Cabinet) replace the partition list of the secondary storage device. If the secondary storage device is bootable, then the Partition within that Cabinet marked as bootable is bootstrapped and is loaded into main memory. The contents of the Partitions and Cabinets may be modified by a user through a graphical user interface.

34 Claims, 7 Drawing Sheets

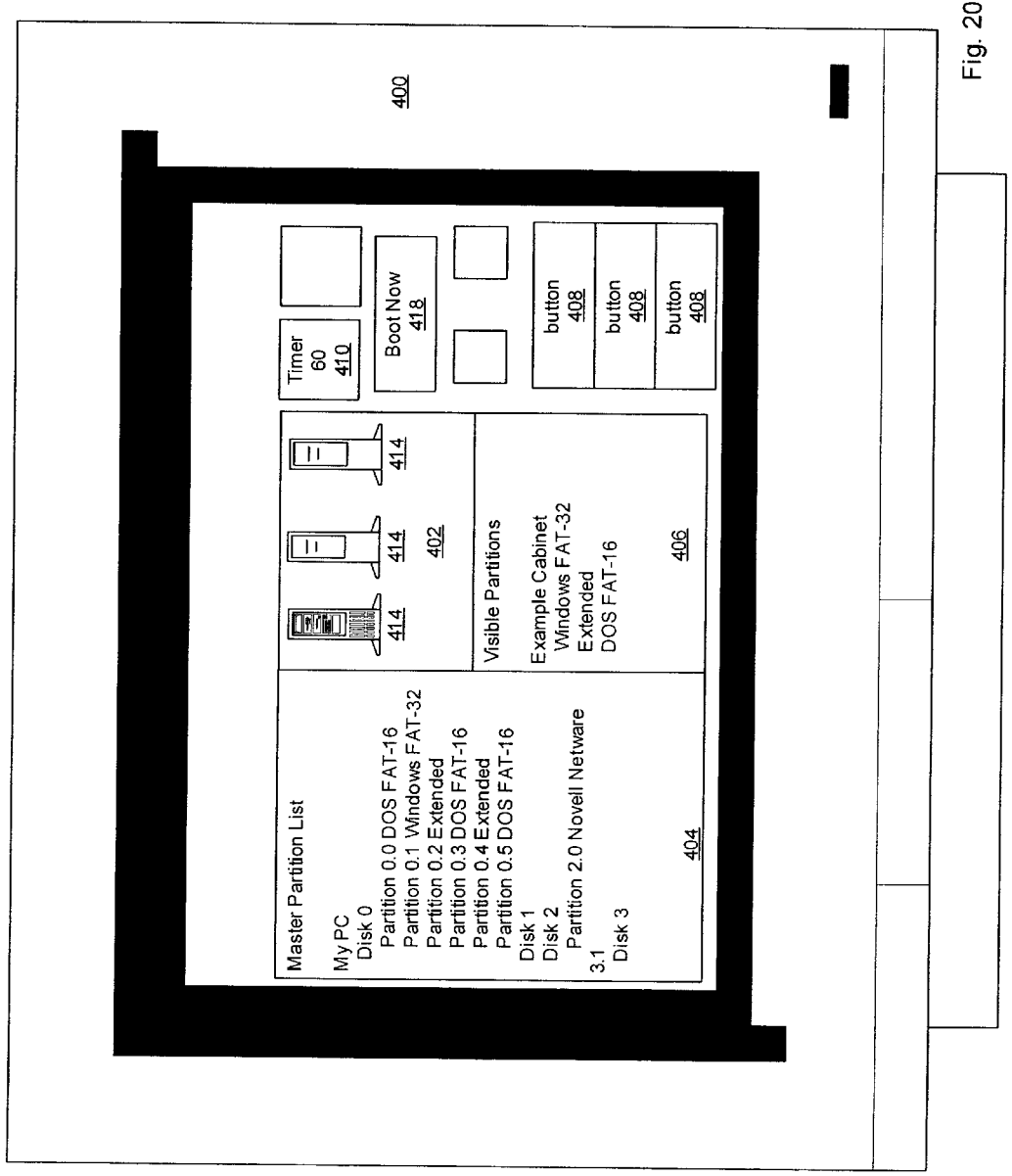

SYSTEM AND METHOD FOR OPERATING SYSTEM INDEPENDENT STORAGE MANAGEMENT

BACKGROUND OF THE INVENTION

1. Field of Invention

This invention relates generally to computer devices, their operating systems, and their secondary storage structures. Specifically, this invention relates to the dynamic manipulation and partitioning of the secondary storage of a computer device.

2. Related Art

Prior art secondary storage devices, that are bootable including hard disks and solid-state disks, include a Master Boot Record (MBR) stored on the first sector of the device. The prior art MBR includes simple executable code and data file in a standard format.

Some secondary storage devices have a single file system that occupies the entire device. Illustrative of such systems are FAT-12 on floppy disks and FAT-16 on Zip™ drives. Other secondary storage devices can be divided into one or more partitions, with each partition having an independent file system organization. Generically, a partition can be defined as a continuous segment of storage. A partition is identified by such information as starting location, size, type, and active flag. Partitions are the basic storage units formatted by operating systems to meet the specific operating system storage allocation and retrieval services needs.

Secondary storage devices for IBM PC and compatible systems as originally designed for DOS contain a structure that can consist of up to four partitions. This four-partition structure was subsequently enhanced so that the last partition can contain more than one logical volume. This enhanced last partition is called an extended partition.

The prior art MBR includes an Initial Program Loader (IPL), a partition table identifying up to four partitions, and a MBR Signature Field. By way of the partitions table, all secondary storage devices can be partitioned into primary partitions, hidden partitions, and extended partitions with multiple logical volumes. As previously disclosed, a prior art secondary storage device MBR can have up to four primary partitions listed in the partition table, each of which may have an independent file system and operating system. Due to standard design limitations of prior art computers, the booting sequence of prior art systems is limited to booting only one of the partitions identified in the partition table. It would thus be beneficial to provide a means by which partitions in; addition to those partitions identified in the partition table can be made bootable for a secondary storage device.

Enabling a greater number of partitions to be bootable for a secondary storage device, in turn, would provide many benefits over the prior art, including:

[1] computer users would have the ability to create a greater number and variety of file systems; and

[2] computer users would have the ability to load a greater number and variety of operating systems.

Providing a greater number and variety of file systems and operating systems in one computer system would also allow computer users to:

[1] take advantage of the specific values and strengths of the different operating systems currently available, in a single personal computer system;

[2] run all application programs on one computer system, regardless of the operating system for which the application program was written;

[3] designate certain partitions, application programs, and/or operating systems for particular users only (i.e., parents versus children, teachers versus students); and

[4] given the proper software protocols, password protect those designated partitions, application programs, and/ or operating systems from unauthorized access.

It would also be a benefit over the prior art to provide a means to dynamically modify the bootable partitions of a secondary storage device.

In order to benefit from multiple bootable operating systems, it would be desirable for the mechanism by which such partitions and operating systems are managed and manipulated to be operating system independent and at a hierarchy level above the run-time operating system. Such a mechanism would be able to function with any operating system without having to be modified. The prior art would therefore be enhanced by a mechanism that manages partitions and operating systems, is operating system-independent, and is located at a hierarchy level higher than the run time operating system.

It would also be beneficial for multiple operating systems to be able to share specific partitions.

It would likewise be desirable and beneficial for such means and mechanisms to be user-friendly.

SUMMARY OF THE INVENTION

Accordingly, the objectives of this invention are to provide, inter alia, a mechanism and means by which to:

boot a greater number of partitions for a secondary storage device and provide standard API to access them;

create a greater number and variety of file systems;

load a greater number and variety of operating systems;

take advantage of the specific values and strengths of the different operating systems currently available;

run all application programs on one computer system, regardless of the operating system for which the application program is written;

designate certain partitions, application programs, and/or operating systems for particular users only (i.e., parents versus children, teachers versus students);

password protect those designated partitions, application programs, and/or operating systems from unauthorized access, given the proper software protocols;

dynamically modify the bootable partitions of a secondary storage device;

manage and manipulate operating systems in a way that is operating system-independent, at a hierarchy level higher than the run time operating system, and in a user friendly manner; and allow multiple operating systems to share partitions.

Other objectives of the invention will become apparent from time to time throughout the specification and claims of this application.

To achieve such improvements, the invention comprises a Storage Manager that dynamically manipulates and partitions the secondary storage of a computer device without re-writing or revising the secondary storage after each manipulation. The Storage Manager is implemented by executable code between the firmware level and the run-time operating system level of a computer device. Means are described to transfer control of the computer device to the Storage Manager prior to the run-time operating system or any application programs gaining control of the computer device. The Storage Manager includes a Virtual Table of Contents (VTOC), in which relevant identifying information is contained for each partition of the secondary storage. At least one Cabinet is created, containing a list of partitions. Each Cabinet may have a separate list of partitions, and each partition may be included in more than one Cabinet. One of the Cabinets is designated as the Active Cabinet. Prior to continuation of the run-time operating system boot sequence, the contents (i.e., the list of partitions within that Cabinet) replace the partition list of the secondary storage device. If the secondary storage device is bootable, then the partition within that Cabinet marked as bootable is boot-strapped and loaded into main memory. The contents of the partitions and Cabinets may be modified by a user through a graphical user interface.

BRIEF DESCRIPTION OF THE DRAWINGS

FIG. 20 is a preferred embodiment of a graphical user interface for managing the VTOC.

DETAILED DESCRIPTION OF THE INVENTION

The present invention comprises a Storage Manager that enables the dynamic partitioning and manipulation of those partitions within a secondary storage device of a computer device, such as a personal computer, a palm top system, and a network server. The secondary storage need not be completely re-written or revised. The Storage Manager is implemented by executable code stored in any of a number of places, including within secondary storage and/or flash memory.

Prior art computer devices include pre-determined start-up or boot sequences which are based on the firmware level of the device. These sequences ultimately load the run-time operating system for that device, which, in turn, controls the device.

Figure 1:
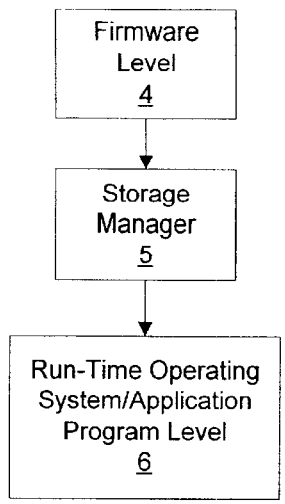
FIG. 1 is a block diagram of the hierarchy of a computer device having a Storage Manager.

The Storage Manager of the present invention takes control of a computer device before the run-time operating system is enabled. In essence, and as illustrated in FIG. 1, the Storage Manager 5 is logically located between the Firmware Level 4 and the run-time operating system and application program levels 6 of a computer device. Since the boot sequence of computer devices is primarily code-driven, there are a variety of means by which to ensure that Storage Manager 5 gains control of the device at the appropriate time.

For example, in personal computers (and in most other computer systems), control is transferred to the run-time operating system by the BIOS ROM code. Typically, the BIOS ROM code looks for the run-time operating system within a secondary storage device. Each secondary storage device has a partition table which identifies the logical device partitions of that particular secondary storage device. If the secondary storage device is bootable, then the partition table is included as part of the Master Boot Record (MBR) of the secondary storage device. In this case, for IBM PC and compatible systems, the partition table within the MBR can consist of up to four primary partitions. One of those four primary partitions can be an extended partition with multiple logical devices.

Figure 2:
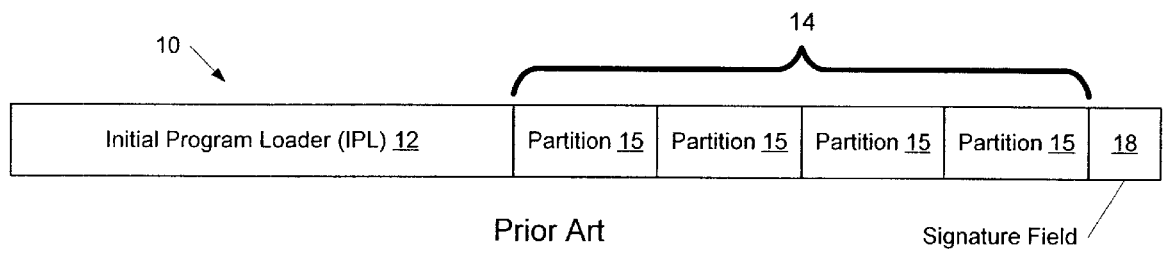
FIG. 2 is a block diagram of a prior art Master Boot Record.

A prior art MBR 10 within a secondary storage device is shown in FIG. 2. The prior art MBR 10 is 512 bytes long and consists of an Initial Program Loader (IPL) 12 (446 bytes), the partition table 14 64 bytes identifying up to four partitions 15, and a MBR Signature Field 18 (2 bytes).

The Storage Manager of the instant invention allows multiple sets of partition tables (each set including a number of partitions) to be created in one secondary storage device, each set being modifiable and capable of replacing the partition table 14 of the secondary storage device. Thus, Storage Manager allows more than four independent file systems and operating systems to be bootable within one computer system. In addition, the invention allows booting of a partition, regardless of its location within the secondary storage device.

During the start-up sequence of a prior art computer device having an MBR 10, after the boot program finishes the power-on self test (POST), the computer device loads the first sector of the first secondary storage device into main memory. The first sector is the location of prior art MBR 10. The computer device ensures that it has loaded the MBR 10 by cross-checking the MBR Signature Field 18 of the MBR 10 against a predetermined value. If the values match, then the computer device passes control to the IPL 12 of the MBR 10. The computer device then loads the IPL 12 into main memory along with whichever one partition is designated 15 as bootable in the partition table 14. If an operating system is stored within the bootable partition, then that operating system is booted into main memory and takes control of the computer system.

Figure 3:
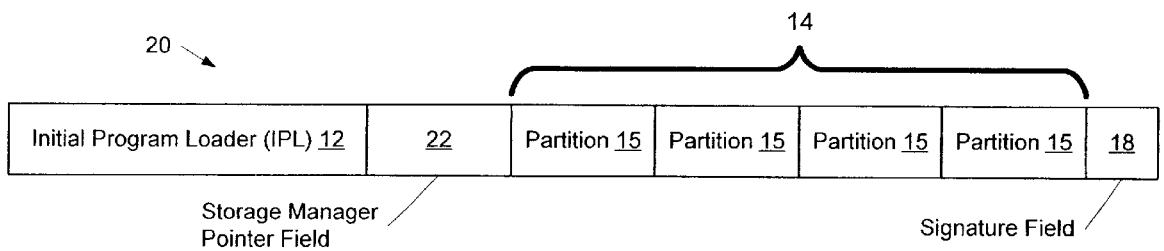
FIG. 3 is a block diagram of the Master Boot Record under the instant invention.

The preferred means by which to ensure that the BIOS ROM transfers control of the computer system to the Storage Manager prior to the IPL 12 loading the bootable partition designated 15 in the partition table 14 is to change the format of the MBR to that shown in FIG. 3. The main difference between the prior art MBR 10 and the present invention MBR 20 is that in the invention, the IPL 12 has been decreased by 12 bytes and a new 12 byte Storage Manager Pointer Field 22 is inserted between IPL 12 and the partition table 14. The MBR 20 length still totals 512 bytes, and it is still located in the first sector of the secondary storage device. The Storage Manager Pointer Field 22 contains the starting logical block address of the executable code for the Storage Manager.

Another means by which to execute the Storage Manager at the proper time is to embed the Storage Manager executable code within FLASH BIOS memory. However accomplished, the only requirement is for the Storage Manager to assume control of the computer device prior to the enablement of a run-time operating system or application program.

The remainder of the application will refer, at various places, to "Partitions" and "Cabinets". A "Partition" is understood to be a distinct segment of physical secondary storage. A "Cabinet" is a list of Partitions chosen from the set of all of the Partitions defined in secondary storage. A Partition may be thought of as a "file drawer" for a Cabinet for which it is listed.

A principal component of the Storage Manager is a Virtual Table of Contents (VTOC). A VTOC is described with reference to FIG. 4. The VTOC 28 dynamically stores in secondary storage the information to define the Partitions and Cabinets. In its preferred embodiment, the VTOC 28 may be generally schematically illustrated as in FIG. 4. The VTOC 28 may include several fields: a VTOC Header Field 30, Records 33, and a Reserved Field 37.

Figure 5:
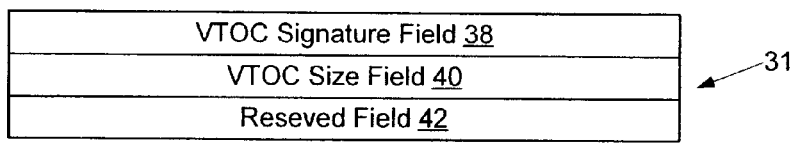
FIG. 5 is a block diagram of the VTOC Header Field.

The VTOC Header Field 30 is described in greater detail with reference to FIG. 5. The VTOC Header Field 31 includes a VTOC Signature Field 38, a VTOC Size Field 40, and a Reserved Field 42. The VTOC Signature Field 38 includes the specific "code" or "signature" signifying the existence of a VTOC 28. The VTOC Size Field 40 defines the total size of the VTOC. The Reserved Field 42 is empty and is available for future use.

Figure 4:
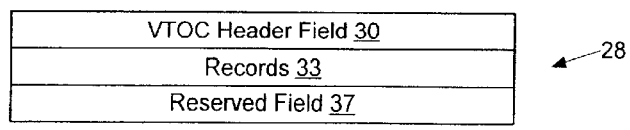
FIG. 4 is a block diagram of the VTOC.
Figure 6:
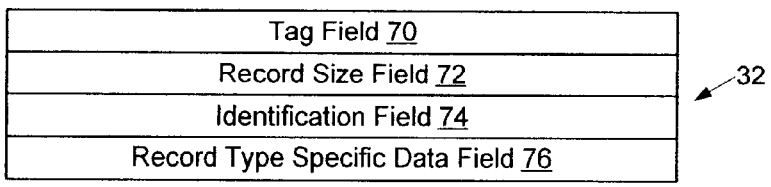
FIG. 6 is a block diagram of a general Record.

Referring to FIG. 4, the Records 33 comprise a set of records which represent either Partitions or Cabinets. Both types of Records 33 preferably have the same general format, as illustrated in FIG. 6. The general Record format 32 includes a Tag Field 70, a Record Size Field 72, an Identification Field 74, and a Record Type Specific Data Field 76. The Tag Field 70 stores information which identifies each record as either a Partition Record or a Cabinet Record. For purposes of example, a Tag Field 70 value of "1" can designate a Partition Record 34, whereas a Tag Field 70 value of "2" may designate a Cabinet Record. The Record Size Field 72 defines the total size of the specific record. The Identification Field 74 stores identifying information for that particular record. The Record Type Specific Date Field 74 stores additional information for that particular record.

Figure 7:
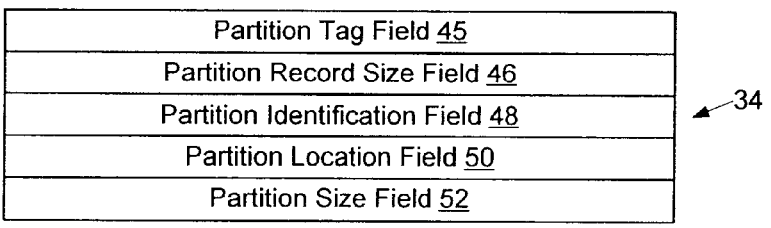
FIG. 7 is a block diagram of a Partition Record.

FIG. 7 illustrates Partition Record 34. The Partition Tag Field 45 has a value of "1" (or whatever other identifier is used within the general record format to designate a Partition Record). The Partition Record Size Field 46 contains the size of the particular Partition Record 34. The Partition Identification Field 48 names the particular record (distinguishing it from all other partition and cabinet records) and the type of file system contained in the referred-to partition. The Record Type Specific Data Field of the general record format comprises a Partition Location Field 50 and a Partition Size Field 52. The Partition Location Field 50 stores the secondary storage starting logical block address of the relevant Partition. The Partition Size Field 52 stores the total size of the relevant Partition.

Figure 8:
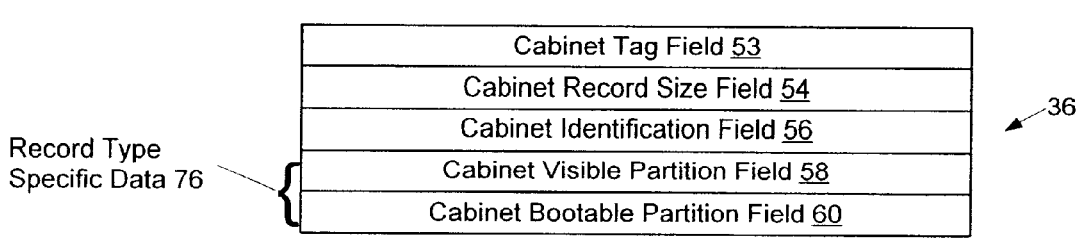
FIG. 8 is a block diagram of a Cabinet Record.

FIG. 8 illustrates Cabinet Record 36. The Cabinet Tag Field 53 has a value of "2" (or whatever other identifier is used within the general record format to designate a Cabinet Record) The Cabinet Record Size Field 54 contains the size of the particular Cabinet Record 36. The Cabinet Identification Field 56 names that particular record (distinguishing it from all other partition and cabinet records). The Record Type Specific Data Field of the general record format comprises a Cabinet Visible Partition Field 58 and a Cabinet Bootable Partition Field 60. The Cabinet Visible Partition Field 58 stores a list of the Partitions selected by the user to be assigned to the Cabinet Record 36. Such assigned Partitions will hereinafter be referred to "Visible Partitions." More particularly, Cabinet Visible Partition Field 58 stores a list of pointers to the relevant Partition Records for the Visible Partitions. As will be discussed herein, the number of Partition Records that may be selected as Visible Partitions for each Cabinet depends on the required file system structure for the run-time operating system. However, the same Partition Record may be selected as a Visible Partition for more than one Cabinet Record. The Cabinet Bootable Partition Field 60 stores the identity of the Visible Partition within the Cabinet Record 36 is selected by the user to be the bootable Partition for that Cabinet Record 36. More particularly, the Cabinet Bootable Partition Field 60 stores a pointer to the relevant field of the Partition Record that holds the information for the bootable Visible Partition.

One of the Cabinet Records is designated by a user as the Active Cabinet. Such designation can be stored as a flag variable in the Cabinet Record of the relevant Cabinet. As will be disclosed further herein, the Active Cabinet information replaces the partition table of the secondary storage device. If the secondary storage device is bootable, the Bootable Partition of the Active Cabinet is then booted into main memory.

In the preferred embodiment, a user may password-protect a specific Partition Record and/or Cabinet Record from access by an unauthorized user. To password protect a Partition Record, as shown in FIG. 7A, an additional field named Partition Password Field 53 is added to each Partition Record 44. The Partition Password Field 53 stores the password designated for that particular Partition Record 44. To password protect a Cabinet Record, as shown in FIG. 8A, an additional field named Cabinet Password Field 61 is added to each Cabinet Record 43. The Cabinet Password Field 61 stores the password designated for that particular Cabinet Record 43.

Computer Boot Sequebce with Storage Manager

Figures 9, 10, 11:
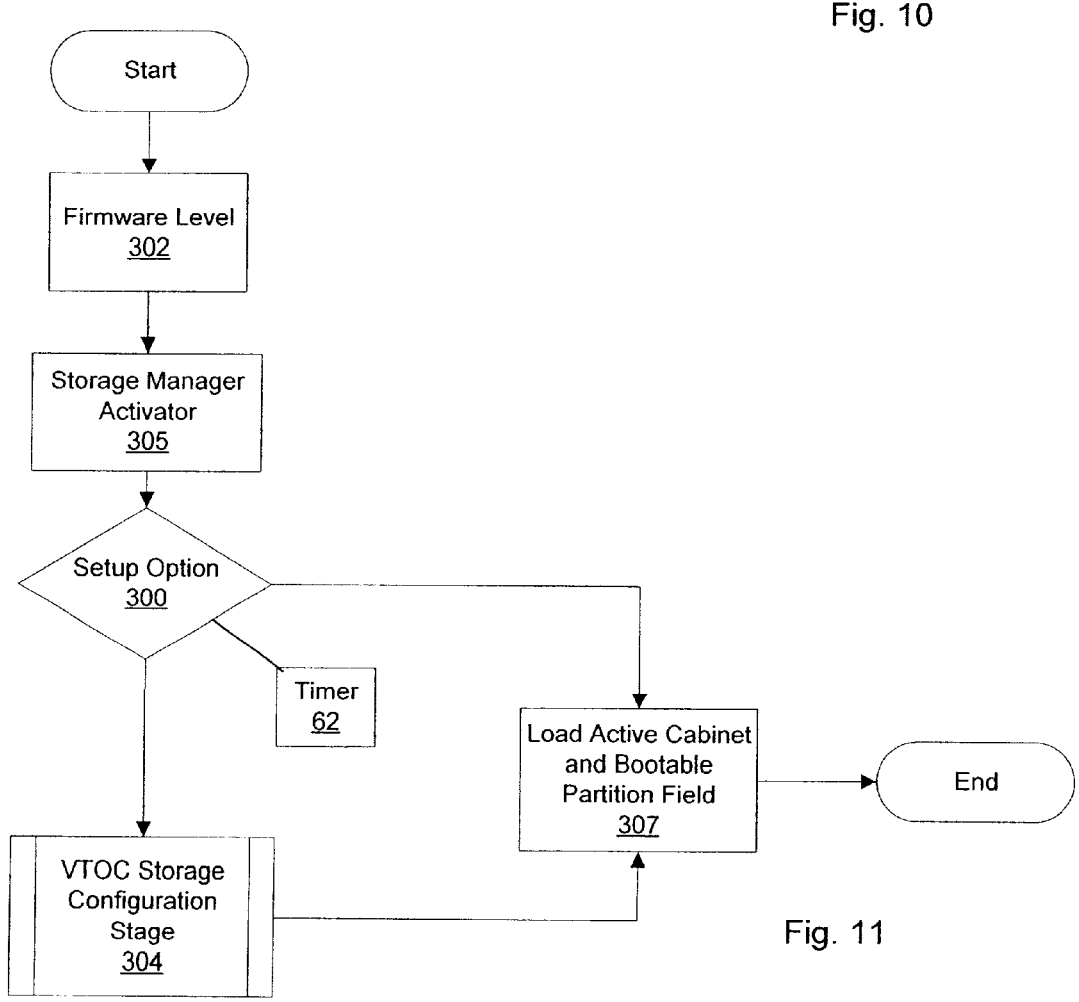
FIG. 9 is a block diagram of a Partition Record including a Partition Password Field.
FIG. 10 is a block diagram of a Cabinet Record including a Cabinet Password Field.
FIG. 11 is a flow chart diagram showing the general start-up sequence under the instant invention.

When activated, a computer device follows the start-up sequence generally illustrated in FIG. 11. The computer first performs its initial boot program at the Firmware Level 302, including the POST. By the means previously disclosed, the Storage Manager 306 is engaged prior to the run-time operating system being activated. The Storage Manager 306 thereby gains control of the computer device.

For example, in the preferred embodiment and for personal computer systems, the computer device Firmware 302 accesses the first sector of the first secondary storage device. Provided that the first secondary storage device includes an MBR under the present invention, the computer device eventually performs the IPL and, at its end, finds the Storage Manager Pointer Field. The computer device reads the contents of the Storage Manager Pointer Field and jumps to the address indicated, which is the starting logical block address of the executable code for the Storage Manager 306. The Storage Manager 306 is then put in control of the computer device.

Storage Manager 306 first reads the information in the VTOC Header Field. It verifies that it has reached the correct location by comparing the value included in VTOC Signature Field with a predefined value. A value match allows the computer device to continue using the VTOC.

Storage Manager Activator 305, part of the Storage Manager, then reads the sequential records contained in VTOC. By reading the Tag Fields of each record, the Storage Manager Activator 305 is able to identify whether each record is a Partition Record or a Cabinet Record. Having identified the type of record, the Storage Manager 305 reads and analyzes the contents of each Partition Record and Cabinet Record and thereby forms and defines the VTOC.

From the user's perspective, the Storage Manager Activator 305 next illustrates the VTOC using a graphical user interface on the computer device screen, through which the user can do a number of things. The user may partition secondary storage devices, change the configuration of Cabinets, or change the Active Cabinet and bootable Partition designation within the Active Cabinet. The preferred embodiment of a graphical user interface for the VTOC will be disclosed herein.

The Storage Manager provides the user an option 300 to enter a "Setup" Mode. The option preferably includes a timer 62 that counts down from a modifiable pre-specified number to "zero". If the timer 62 reaches "zero" and the user has not provided the appropriate input to the computer (either by clicking the mouse or by hitting a predetermined key), then the Storage Manager replaces 307 the partition table of the secondary storage device with the Active Cabinet information. If the secondary storage device is bootable, then the current bootable Partition within the Active Cabinet is booted into main memory.

If the user elects 300 the setup options, then, the Storage Manager enters a VTOC Configuration Stage 304 and timer 62 is stopped. At the VTOC Configuration Stage 304, the user has the opportunity to partition secondary storage devices, change the configuration of Cabinets, or change the Active Cabinet or bootable Partition within that Cabinet. Unless the user wishes to perform one of the listed configuration functions, the user should not provide the triggering an input to the computer device during the Setup option 300. After the user completes the VTOC Configuration Stage 304, the Storage Manager continues to replace 307 the partition table 14 of the secondary storage device, the Active Cabinet and, if the secondary storage device is bootable, boot the bootable Partition into main memory.

Figure 12:
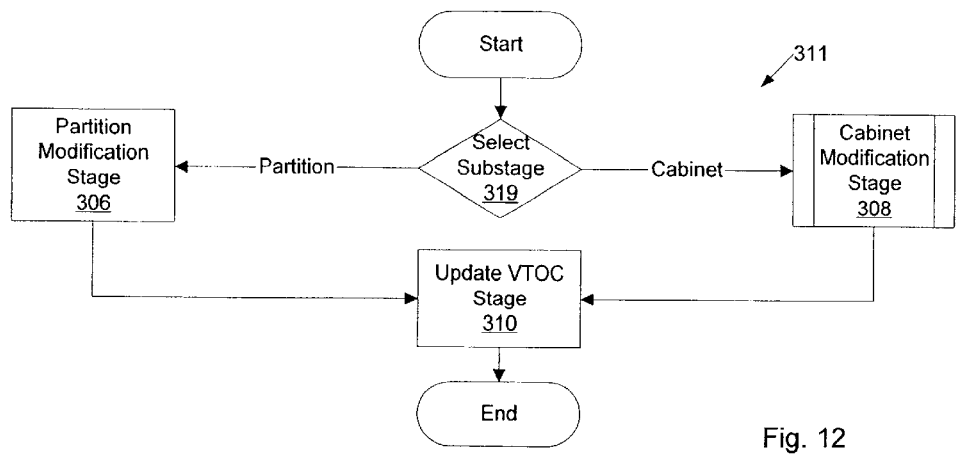
FIG. 12 is a flow chart diagram showing the execution of the VTOC Storage Configuration Stage.

The details of the VTOC Storage Configuration Stage 304 are illustrated in FIG. 12. Within the VTOC Storage Configuration Stage 311, one of two sub-stages can be selected 319 by the user. In the Partition Modification Stage 306, the user is able to modify (add, delete, or otherwise alter) the existing partition scheme of the secondary storage devices of the computer system. In the Cabinet Modification Stage 308, the user is able to modify the existing Cabinet scheme of the computer system, including modifying the Active Cabinet and the bootable Partition within each Cabinet. If the user makes any changes during either the Partition Modification Stage 306 or the Cabinet Modification Stage 308, then such changes are updated in the VTOC at the VTOC Update Stage 310.

In the Partition Modification Stage 306, the user may partition or re-partition each of the secondary storage devices attached to the computer device. Importantly, more than one secondary storage device may be attached to the computer device, and the Partition Modification Stage 306 enables the configuration of each such device. Each secondary storage device may be partitioned into as many Partition Records as is allowed by storage capacity, each Partition Record capable of having an independent file system. If the partition scheme is changed during the Partition Modification Stage 306, then, at the subsequent VTOC Update Stage 310, Storage Manager automatically updates the VTOC Header Field and the relevant Partition Records according to the changes made in the Partition Modification Stage 306. Thus, the Storage Manager modifies the Partition Record Size Fields if the sizes of the Partition Records were modified; the Partition Identification Fields if partitions were added, deleted, or modified; the Partition Location Fields if the starting addresses for partitions were modified; and the Partition Size Fields if the sizes of the partitions were modified. Accordingly, all relevant information for the new partition scheme is recorded in VTOC.

Figure 13:
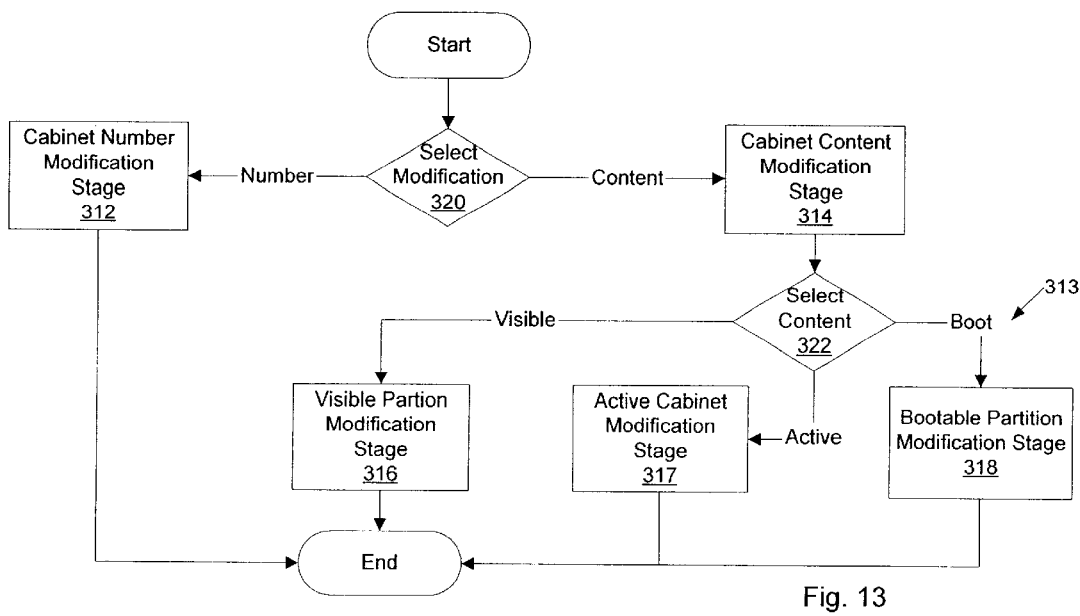
FIG. 13 is a flow chart diagram showing the execution of the Cabinet Modification Stage.

In the Cabinet Modification Stage 308, the user may modify the number of Cabinet Records (by deleting or adding Cabinets), modify the contents of each Cabinet Record, change the Active Cabinet, and/or modify the bootable partition within each Cabinet Record. The number of Cabinet Records is limited only by the storage space available to the Storage Manager. The Cabinet Modification Stage 308 is illustrated in FIG. 13. The Cabinet Modification Stage 313 includes a Cabinet Number Modification Stage 312 and a Cabinet Content Modification Stage 314, either of which may be selected 320.

In the Cabinet Number Modification Stage 312, the user may add a Cabinet Record to or delete a Cabinet Record from the computer system scheme. If a Cabinet Record is added, the size of the Cabinet Record must be defined and placed in the Cabinet Record Size Field, a unique identification number must be given and stored in the Cabinet Identification Field, the Visible Partitions must be selected for the Cabinet Record and placed in the Cabinet Visible Partitions Field, and the Bootable Partition must be selected for the Cabinet Record and placed in the Cabinet Bootable Partition Field.

In the Cabinet Content Modification Stage 314, the user may modify the Visible Partitions for any of the existing Cabinet Records by selecting 322 to enter the Visible Partition Modification Stage 316. The user may elect 322 to modify the designation of the Active Cabinet and enter the Active Cabinet Modification Stage 317. The user may opt 322 to modify the Bootable Partition of each Cabinet Record and enter the Bootable Partition Modification Stage 318.

In the Visible Partition Modification Stage 316, the user may designate Partition Records as Visible Partitions for each Cabinet Record. As previously disclosed, the number of Partition Records that can be designated as Visible Partitions for each Cabinet Record depends on the requirements of the run-time operating system for that Cabinet Record. A pointer to the Partition Record for each Visible Partition, which includes the starting logical block address is stored in the VTOC under the relevant Cabinet Visible Partition Field. The user may elect any Partition Record to be a Visible Partition of a Cabinet Record. The elected Partition Record is not "saved" or "stored" exclusively under the relevant Cabinet Record once it is designated as a Visible Partition for that Cabinet Record. Instead, once designated, the Partition Record is included in the list which comprises that Cabinet Record. Thus, a Partition Record may be designated as a Visible Partition for more than one Cabinet Record by being included in each respective Cabinet Record.

In the Active Cabinet Modification Stage 317, the user can designate any of the existing Cabinet Records as the "Active Cabinet" which will replace the partition table of the secondary storage device. Only one Cabinet Record at a time may be designated the Active Cabinet.

In the Bootable Partition Modification Stage 318, the user may designate one of the Visible Partitions within each Cabinet Record as the bootable Partition for that Cabinet Record. Only one Visible Partition may be designated as the bootable Partition for each Cabinet Record.

If the existing Cabinet scheme is changed in the Cabinet Modification Stage 308, then, at the subsequent VTOC Update Stage, the Storage Manager automatically updates the relevant Cabinet Records according to the changes made in the Cabinet Modification Stage 313. The Storage Manager modifies the Cabinet Record Size Fields if the sizes of the Cabinet Records are modified, the Cabinet Visible Partitions Fields if the Visible Partitions are modified, or the Cabinet Bootable Partition Fields if the bootable Partition within a Cabinet Record is changed, thereby ensuring that the information for the new Cabinet scheme is recorded in the VTOC. The Storage Manager further updates the Active Cabinet flag of the relevant Cabinet Records if the designation of the Active Cabinet is modified.

Because Storage Manager updates any changes to the Partition and/or Cabinet scheme of the secondary storage at the VTOC Update Stage, the VTOC is a dynamic storage structure, changing as the scheme for the secondary storage changes.

In the embodiment of the VTOC including the Partition Password Field and Cabinet Password Field, only users providing the correct passwords will be able to access the relevant Partitions and Cabinets. At the Partition Modification Stage, if a user attempts to modify or access a Partition Record that is password-protected, the user will be prompted to enter the password. The computer device then cross-checks the user's entry against the password stored in the Partition Password Field for the particular Partition Record. If there is a match, the Storage Manager allows manipulation and use of that Partition Record. Otherwise, Storage Manager does not allow the user to manipulate or use the Partition Record. In addition, at the Cabinet Modification Stage 313, if a user attempts to modify or access a Cabinet Record that is password protected, the user will be prompted to enter the password. The computer device then cross-checks the user's entry with the password stored in the Cabinet Password Field for that particular Cabinet Record. If there is a match, the Storage Manager allows manipulation and use of that Cabinet Record. Otherwise, Storage Manager does not allow the user to manipulate, or use the Cabinet Record.

Password protection of the Partition Records and the Cabinet Records 36 is useful, for example, in parent-child or teacher-student situations, where the parents or teachers do not want the children or students to have access to the Partition Records or Cabinet Records.

Referring again to FIG. 11, once the user completes the VTOC Configuration Stage 304, the Storage Manager continues to the Load Active Cabinet and Bootable Partition Stage 307. In the Load Active Cabinet and Bootable Partition Stage 307, the list of the Visible Partitions of the Active Cabinet is placed in the partition list of the secondary storage device. If the secondary storage device is bootable (i.e., includes an MBR) and the bootable Partition holds an operating system, then that operating system is bootstrapped into main memory and takes control of the computer device. The Bootable Partition need not include an operating system, allowing application programs that do not require the use of operating systems to be loaded directly into main memory, bypassing the operating system level.

When an Active Cabinet is loaded, the list of Visible Partitions for that Active Cabinet replaces the partition table of the secondary storage device. The number of Visible Partitions must correlate to the number of partitions the run-time operating system (or application program) requires. If the bootable Partition for the Active Cabinet loads an operating system requiring no more than the typical four Partitions, then no more than four Visible Partitions may be listed in the Cabinet Record. If the bootable Partition for the Active Cabinet loads an operating system requiring only one Partition, then only one Visible Partition may be listed in that Cabinet's Cabinet Record.

Once the run-time operating system (or application program) controls the computer device, that run-time system can acknowledge the existence of only the Partitions listed in the partition table. Thus, any Partitions not listed in the Active Cabinet as Visible Partitions are invisible to and not recognized by the run-time operating system.

Figure 14:
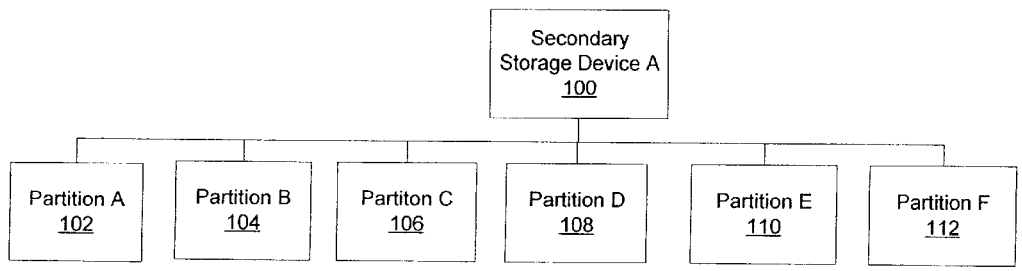
FIG. 14 is a block diagram depicting a possible partition scheme for a system having a single secondary storage device A.
Figure 15:
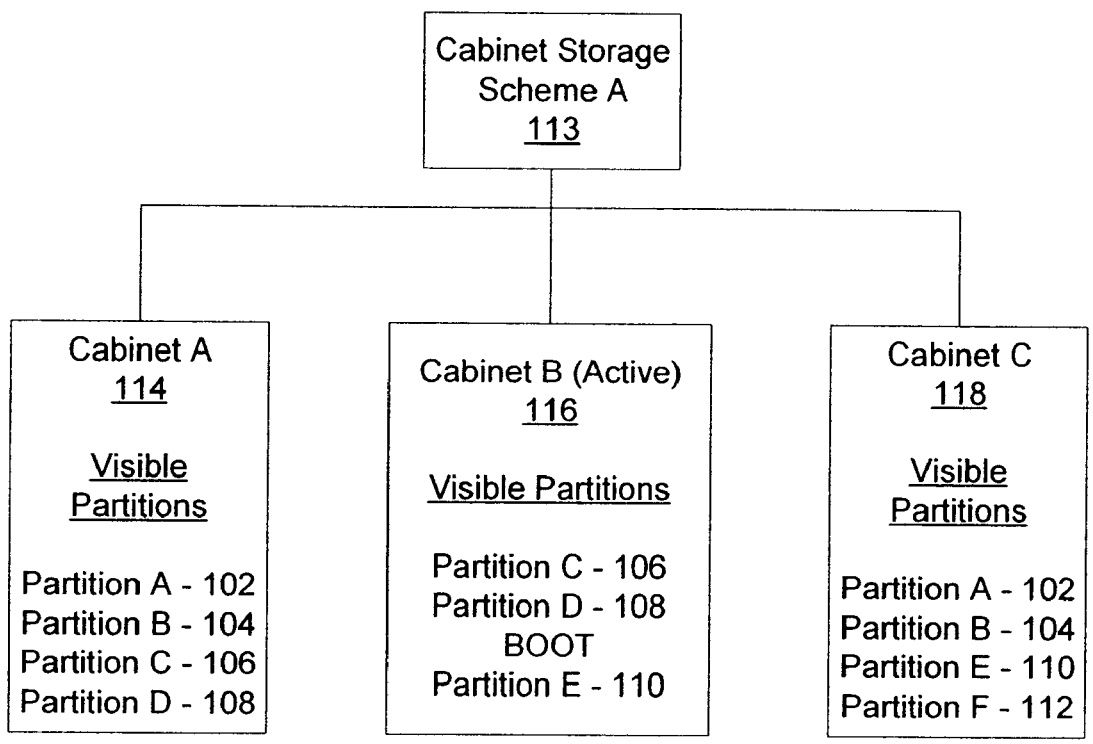
FIG. 15 is a block diagram depicting a possible cabinet storage scheme for the system having a single secondary storage device.

FIGS. 14 and 15 illustrate a possible Partition and Cabinet scheme for a single secondary storage device A 100. Secondary storage device A 100 can be "partitioned" into multiple logical devices or Partitions. FIG. 14 shows secondary storage device A 100 configured into six partitions: Partition A 102, Partition B 104, Partition C 106, Partition D 108, Partition E 110, and Partition F 112. FIG. 15 shows the Cabinet scheme A 113 for the computer device. Cabinet scheme A 113 includes three Cabinet Records: Cabinet A 114, Cabinet B 116, and Cabinet C 118, each having its own list of Visible Partitions. As can be seen from FIG. 15, Cabinet A 114 includes Partition A 102, Partition B 104, Partition C 106, and Partition D 108 as Visible Partitions. Partition C 106, Partition D 108, and Partition E 110 are designated as Visible Partitions for Cabinet B 116. Partition A 102, Partition B 104, Partition E 110, and Partition F 112 are designated as Visible Partitions for Cabinet C 118. With Cabinet B 116 marked as the Active Cabinet, the list of Visible Partitions for Cabinet B 116 will be loaded to replace the partition table, and Partition D 108, which is marked bootable, will be bootstrapped into main memory.

Notably, several Partition Records 34 are included as Visible Partitions for more than one Cabinet Record. For instance, Partition A 102 is included as a Visible Partition for both Cabinet A 114 and Cabinet C 118. Thus, Partition A 102 is shared between the run-time operating systems of Cabinet A 114 and Cabinet C 118. From the standpoint of any particular Cabinet Record, a Partition Record not listed as a Visible Partition for that Cabinet Record is hidden from the view of the run-time operating system. For instance, when Cabinet B 116 is booted, all Partitions other than Partition C 106, Partition D 108, and Partition E 110 (which are the designated as the Visible Partitions for that Cabinet) are effectively hidden from view. Therefore, any run-time operating systems under Cabinet B 116 will be able to access only the designated Visible Partitions.

Figure 16:
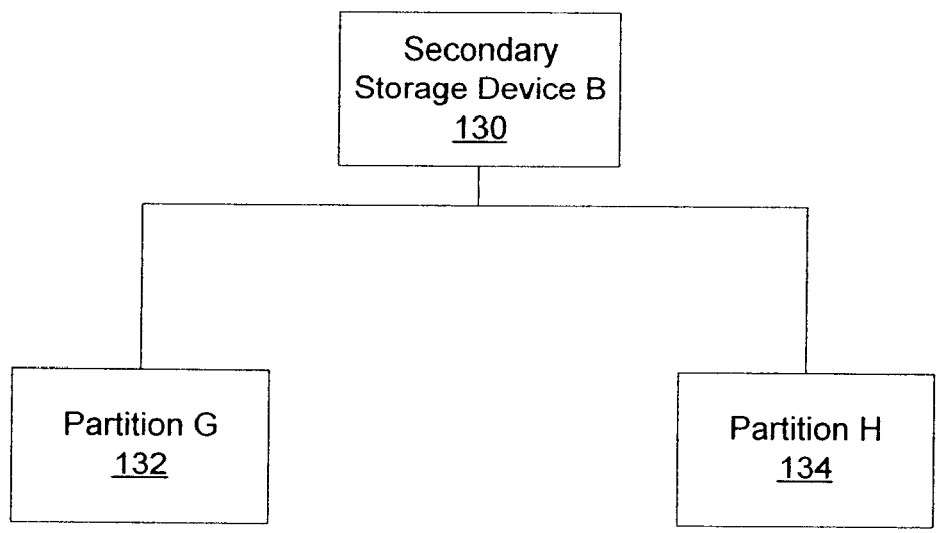
FIG. 16 is a block diagram depicting a possible partition scheme for a second secondary storage device within the system.
Figure 17:
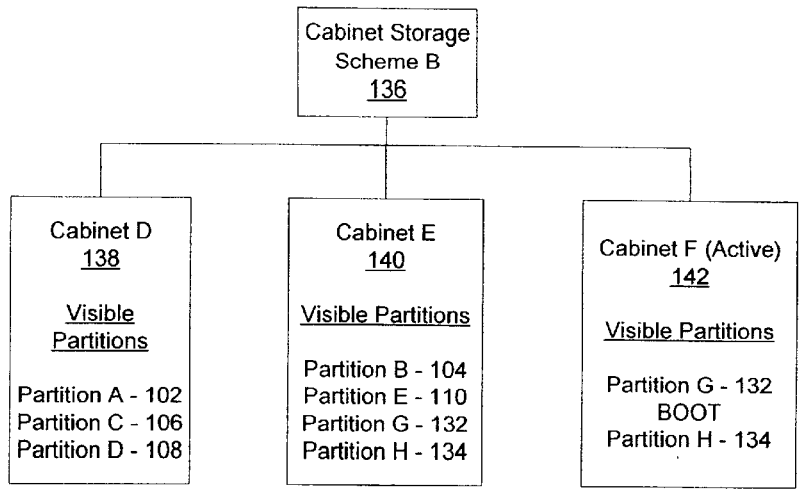
FIG. 17 is a block diagram depicting a possible Cabinet storage scheme for a system having two secondary storage devices.

Applicant's invention also functions on a computer device that features multiple secondary storage devices. FIGS. 16 and 17 illustrate a possible Partition and Cabinet Scheme for a computer device having multiple secondary storage devices. FIG. 16 shows secondary storage device B 130 configured into two partitions: Partition G 132 and Partition H 134. FIG. 17 shows the Cabinet scheme B 136 for the computer device including both secondary storage device A (100 from FIG. 14) and secondary storage device B (130 from FIG. 16). Cabinet scheme B 136 includes three Cabinet Records: Cabinet D 138, Cabinet E 140, and Cabinet F 142, each having its own list of Visible Partitions. As can be seen from FIG. 17, the Cabinet D 138 list includes Partition A 102, Partition C 106, and Partition D 108 as Visible Partitions. Partition B 104, Partition E 110, Partition G 132, and Partition H 134 are designated as Visible Partitions for Cabinet E 140. Partition G 132 and Partition H 134 are designated as Visible Partitions for Cabinet F 134. As Cabinet F 142 is marked as the Active Cabinet, the list of Visible Partitions in Cabinet F 142 will be loaded to replace the partition table, and Partition G 132, which is marked as bootable, will be bootstrapped into main memory.

Cabinet D 138 includes Partitions that are all located within secondary storage device A, Cabinet E 140 includes Partitions that are located in secondary storage device A and secondary storage device B. Cabinet F 142 includes Partitions that are all located within secondary storage device B. Thus, the contents of any Cabinet need not be limited to the physical bounds of a single secondary storage device. This feature provides great flexibility to the Cabinet Record structures.

Figure 18:
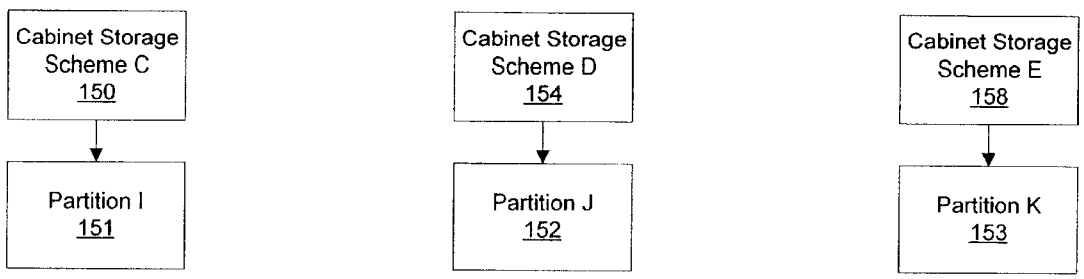
FIG. 18 is a block diagram depicting possible partition scheme for a system having three secondary storage devices.
Figure 19:
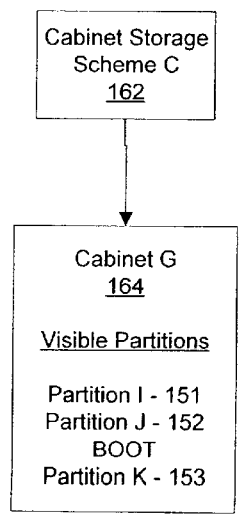
FIG. 19 is a possible cabinet storage scheme for a system having three secondary storage devices.

Applicant's invention also functions when each Partition Record corresponds to an entire secondary storage device. FIG. 18 illustrates the example of a secondary storage device C 150 configured into one Partition I 152 (comprising the entire storage area of secondary storage device C 150), secondary storage device D 154 configured into one Partition J 156 (comprising the entire storage area of secondary storage device D 154), and secondary storage device E 158 configured into one Partition K 160 (comprising the entire storage area of secondary storage device E 158). FIG. 19 shows a possible Cabinet storage scheme C 162 for a computer device including secondary storage device C 150, secondary storage device D 154, and secondary storage device E 158. Cabinet storage scheme C 162 includes only one Cabinet: Cabinet G 164. The Visible Partitions of Cabinet G 164 are Partition I 152, Partition J 156, and Partition K 160. Upon selection of Cabinet G 164, the list of Visible Partitions for Cabinet G 164 will replace the partition table, and Partition J 156, which is marked as bootable, will be bootstrapped into main memory.

Notably, each of the Visible Partitions of Cabinet G 164 is on a separate, independent secondary storage device. Thus, the Cabinet structure used as shown in Cabinet storage scheme C 162 could be used to bind multiple secondary storage physical devices into one virtual device. Further, secondary storage device D can be the only device that is bootable (i.e., includes an MBR). The other devices, since they are not booted, need only include a partition table.

As previously disclosed, from the user's perspective, the VTOC is preferably illustrated within the Storage Manager using a graphical user interface on a computer screen. FIG. 20 demonstrates preferred embodiment of the graphical user interface ("GUI") 400.

The GUI 400 comprises a Cabinets window 402, a Partitions window 404, and a Visible Partitions window 406. GUI 400 may also comprise at least one direct button 408 and a timer window 410.

The Partitions window 404 graphically illustrates each Partition Record included in the VTOC. In the Partitions window 404 as shown, four secondary storage devices are attached to the computer system: Disk 0, Disk 1, Disk2, and Disk 3. Each secondary storage device is in turn configured into at least one Partition. For instance, Disk 0 is configured into six Partitions:

Partition 0.0 DOS FAT-16, Partition 0.1 Windows FAT-32, Partition 0.2 Extended, Partition 0.3 DOS FAT-16, Partition 0.4 Extended, and Partition 0.5 DOS FAT-16. Disk 2 is configured into one Partition: Partition 2.0 Novell NetWare. The partitions of Disk 1 and Disk 3 are not shown for purposes of clarity. The GUI 400 may provide the opportunity to configure or re-configure secondary storage devices by clicking on an item on a toolbar 412.

The Cabinets window 402 illustrates each Cabinet Record currently existing in the VTOC. A symbol 414 indicating the primary operating system designated for each Cabinet Record may also appear on the illustrated Cabinet so that the user may easily distinguish one Cabinet from the other. In the Cabinets window 402, one Cabinet may be highlighted at a time by clicking. The contents (Visible Partitions) of the highlighted Cabinet appear in the Visible Partitions window 406. The Active Cabinet may be changed by clicking an item on the toolbar 412.

The Visible Partitions window 406 illustrates the Partition Records that have been selected as Visible Partitions for the Cabinet highlighted in Cabinets Window 402. For instance, as depicted, three Visible Partitions are in the Cabinet Record highlighted in the Cabinets window 402: Windows FAT-32, Extended, and DOS FAT-16. Any one of these Visible Partitions may be selected as the bootable Partition for the highlighted Cabinet Record. The bootable Partition may be changed by clicking an item on the toolbar 412. The Visible Partitions may be modified by clicking and dragging them from Visible Partitions window 406 and Partitions window 404.

The GUI 400 also includes a timer window 410. Timer window 410 is the graphical representation of the timer that is associated with the entry into setup mode (see 62 at FIG. 11). The timer window 410 counts down from a modifiable pre-specified number to "zero". If the timer window 410 reaches "zero" and the user has not provided input to the computer device, then the then current Active Cabinet replaces partition table and the system boots. If the user provides input to the computer device prior to the timer window 410 reaching "zero", then the storage manager begins the VTOC Configuration Stage and the countdown in the timer window 410 is stopped.

In addition, the GUI 400 includes at least one direct button 408. Each direct button 408 is associated with an application program that does not require an operating system to be loaded directly into main memory. These application programs can boot themselves, bypassing the operating system level. Because these application programs can boot themselves, they need not be designated as a Visible Petition or bootable Partition within a Cabinet Record. In essence, each application program associated with a direct button 408 is located at the same hierarchical level as the Storage Manager. When the user clicks on one of the direct buttons 408, the associated application program is loaded directly into main memory.

Direct buttons 408 allow application programs to be wholly independent of operating systems. Examples of such operating system-independent programs are Internet browsers, online services, system support, computer device service and help, video conferencing, database/client applications, and turnkey applications for the banking, insurance, education, shopping, stock and other industries.

By using of direct buttons 408, manufacturers of programs may include their programs in multi-function computer systems and need not worry about the compatibility of their programs with the different operating systems.

The GUI 400 may further include a Go Now button 416. If the Go Now button 416 is clicked, then the Storage Manager immediately commences the Load Active Cabinet and Bootable Partition Stage. If a user has run the VTOC Configuration Stage, the Go Now button 416 may be clicked to subsequently execute the Load Active Cabinet and Bootable Partition Stage.

The GUI 400 may also display an Active Cabinet in the Active Cabinet window 418. The Active Cabinet window 418 includes a symbol 414 for the Active Cabinet.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A storage system for a computer comprising:
   a set of storage devices, including a first storage device having a partition table, the set of storage devices having among them a plurality of partitions;
   a first partition among the plurality of partitions;
   a table of contents (TOC) data structure, the TOC data structure having multiple partition records, each describing the extent of a member of the set of partitions on the storage system, and having a set of cabinet records;
   a first partition record within the TOC data structure, the first partition record describing the extent of the first partition;
   a first cabinet record within the TOC data structure, the first cabinet record containing reference to the first partition record,
   wherein the first cabinet record is designated as an active cabinet and only one cabinet record is designated as the active cabinet, and
   wherein the storage system is configured to replace the partition table with a new partition table comprising the extents of each of the partition records within the active cabinet.

2. The system of claim 1 further comprising:
   a second partition;
   a second partition record within the TOC data structure, the second partition record describing the extent of the second partition,
   wherein the second partition record is referenced within the first cabinet record.

3. The system of claim 1 wherein the set of storage devices comprises a set of secondary storage devices.

4. The system of claim 3 wherein the set of secondary storage devices comprises a set of hard disk drives.

5. The system of claim 1 further comprising:
   a computer device having an operating system wherein the storage system operates independently of the operating system.

6. The system of claim 1 further comprising:
   a computer device having a memory wherein the TOC data structure is stored within the memory.

7. The system of claim 1 wherein the memory in which the TOC data structure is stored is located within secondary storage memory.

8. The system of claim 1 wherein the memory in which the TOC data structure is stored is non-volatile random access memory.

9. The system of claim 1 further comprising:
   a computer device having a memory wherein the codes to effect the configuration of the storage system are stored within the memory.

10. The system of claim 9 wherein the memory in which the codes are stored is located within secondary storage memory.

11. The system of claim 9 wherein the memory in which the codes are stored is located within non-volatile random access memory.

12. The system of claim 6 further comprising:
    an operating system wherein the storage system operates independently of the operating system.

13. The system of claim 1 wherein the partition records each comprise:
    a partition size field which describes the size of a member of the set of partitions; and
    an identification field which identifies the member of the set of partitions.

14. The system of claim 13 wherein the partition records each further comprise a partition location field which describes the location of the member of the set of partitions.

15. The system of claim 1 wherein the partition records each comprise:
    a partition location field which describes the location of a member of the set of partitions; and
    an identification field which identifies the member of the set of partitions.

16. The system of claim 1 wherein each member of the set of cabinet records comprises:
    a visible partition field which describes the identity of a visible set of partition records;
    an active partition field which designates the cabinet record as active; and
    an identification field which identifies the member of the set of cabinet records.

17. The system of claim 14 wherein each member of the set of cabinet records comprises:
    a visible partition field which describes the identity of a visible set of partition records;
    an active partition field which designates the cabinet record as active; and
    an identification field which identifies the member of the set of cabinet records.

18. The system of claim 13 wherein each member of the set of cabinet records comprises:
    a visible partition field which describes the identity of a visible set of partition records;
    an active partition field which designates the cabinet record as active; and
    an identification field which identifies the member of the set of cabinet records.

19. The system of claim 17 wherein the TOC data structure comprises a tag field to designate each record as a member of the set of partition records or a member of the set of cabinet records.

20. The system of claim 17 wherein the TOC data structure is a virtual table of contents data structure.

21. A method for enabling multiple partitions in a set of secondary storage devices, comprising the steps of:
    dividing the set of secondary storage devices into multiple partitions;

creating a table of contents (TOC) data structure to manage the multiple partitions, the TOC data structure having multiple partition records each describing the extent of a partition;

representing a first partition as a first partition record within the TOC data structure, the first partition record describing the extent of the first partition;

representing a first cabinet as a first cabinet record within the TOC data structure, the first cabinet record containing reference to the first partition record;

designating the first cabinet and only the first cabinet as an active cabinet; and replacing the partition table of the secondary storage device with a new partition table composed of the extents of each of the partition records within the active cabinet.

22. The method of claim 21 wherein the step of replacing the partition table is performed each time a member of the set of secondary storage devices is booted.

23. The method of claim 21 wherein the step of creating the TOC data structure creates a structure comprising:

a tag field; and an identification field, wherein the tag field designates the type of record within the TOC data structure, and wherein the identification field designates an identifier for the record, and wherein the partition records and the cabinet records are each represented within the TOC data structure, differentiated by the tag field.

24. The method of claim 21 wherein each of the steps is performed within the context of a computer system.

25. The method of claim 24 wherein each of the steps is performed without reference to an operating system on the computer system.

26. The method of claim 21 further comprising the step of replacing the master boot record of a member of the set of secondary storage devices so as to redirect booting to a management program.

27. The method of claim 26 wherein the management program is used to perform the steps of creating a TOC data structure, representing the first partition, representing the first cabinet, designating the active cabinet, and replacing the partition table.

28. The method of claim 27 wherein the management program operates without reference to an operating system.

29. A set of computer codes for enabling multiple partitions in a set of secondary storage devices, comprising:

a set of computer codes operable to divide the set of secondary storage devices into multiple partitions;

a set of computer codes operable to create a table of contents (TOC) data structure to manage the multiple partitions, the TOC data structure having multiple partition records each describing the extent of a partition, a set of computer codes operable to represent a first partition as a first partition record within the TOC data structure, the first partition record describing the extent of the first partition;

a set of computer codes operable to represent a first cabinet as a first cabinet record within the TOC data structure, the first cabinet record containing reference to the first partition record;

a set of computer codes operable to designate the first cabinet and only the first cabinet as an active cabinet; and a set of computer codes operable to replace the partition table of the secondary storage device with a new partition table composed of the extents of each of the partition records within the active cabinet.

30. The codes of claim 29 wherein each of the sets of computer codes is operable within the context of a computer system.

31. The codes of claim 30 wherein each of the steps is performed without reference to an operating system on the computer system.

32. The codes of claim 29 further comprising codes to perform the step of replacing the master boot record of a member of the set of secondary storage devices so as to redirect booting to a management program.

33. The codes of claim 32 wherein the management program includes the codes used to perform the steps of creating a TOC data structure, representing the first partition, representing the first cabinet, designating the active cabinet, and replacing the partition table.

34. The codes of claim 33 wherein the management program operates without reference to an operating system.

* * * * *